J. F. VANDERBOSS.
EXERCISING MACHINE.
APPLICATION FILED APR. 24, 1908.
928,085.
Patented July 13, 1909.
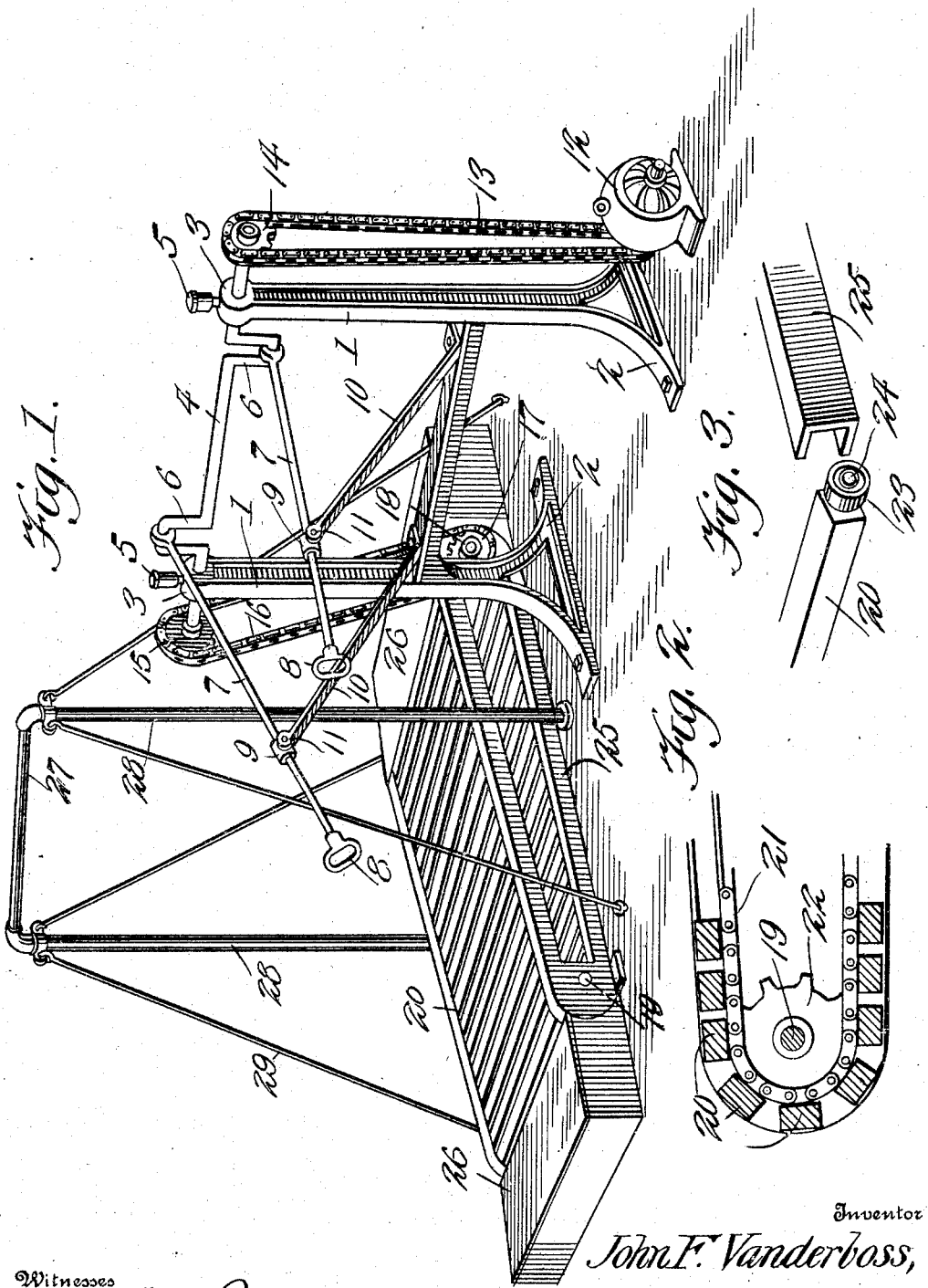
Inventor
John F. Vanderboss,
By Victor J. Evans.
Attorney
Witnesses

UNITED STATES PATENT OFFICE.

JOHN F. VANDERBOSS, OF CHICAGO, ILLINOIS.

EXERCISING-MACHINE.

No. 928,085.  Specification of Letters Patent.  Patented July 13, 1909.

Application filed April 24, 1908. Serial No. 429,041.

*To all whom it may concern:*

Be it known that I, JOHN F. VANDERBOSS, a citizen of the United States, residing at Chicago, in the county of Cook and State of Illinois, have invented new and useful Improvements in Exercising-Machines, of which the following is a specification.

This invention relates to exercising machines, the object in view being to provide a machine of the character referred to which is mechanically driven and which will induce athletic exercise by forcing the operator to exercise the muscles of his body while in touch with the machine, the machine embodying means for exercising the arms as well as the legs and other parts of the body.

With the above and other objects in view, the invention consists in the novel construction, combination and arrangement of parts herein fully described, illustrated and claimed.

In the accompanying drawing, Figure 1 is a perspective view of the complete exercising machine. Fig. 2 is an enlarged detail vertical longitudinal section through one end of the tread mill. Fig. 3 is a detail perspective view illustrating the engagement between the bars of the tread mill and the guides therefor.

The machine contemplated in this invention comprises a pair of standards 1 set at a suitable distance apart and having enlarged base portions 2 adapting said standards to be securely fastened to the floor as shown in Fig. 1. The standards are provided at their upper ends with bearings 3 for the reception of a horizontally disposed crank shaft 4, 5 designating oil cups by means of which the shaft 4 is lubricated.

The shaft 4 is provided with oppositely set cranks 6 to which are connected rods 7 provided at their forward ends with handles 8 adapted to be grasped by the operator. The rods 7 pass through bearing sleeves 9 which are supported by forwardly extending bracket arms 10, the bearing sleeves 9 having a pivotal engagement with the bracket arms 10, as shown at 11, thus providing for the oscillatory movements of said rods under the influence of the crank shaft 4 by which said rods are driven.

Motion is imparted to the crank shaft 4 by means of a motor 12 such as an electric motor which may be secured to the floor as shown in Fig. 1 and from which a drive chain 13 extends upward over a sprocket wheel 14 fast on one end of the crank shaft 4.

To the opposite end of the crank shaft 4 is secured another sprocket wheel 15 from which a drive chain 16 extends downward around another sprocket wheel 17 on a shaft 18 at one end of a tread mill, said mill comprising another shaft 19 at the opposite end thereof. The shaft 18 is provided with a pair of sprocket wheels (not shown) around which passes an endless tread mill element consisting of an endless series of parallel slats or bars 20 suitably connected together by endless chains 21 at the opposite ends of said bars. The shaft 19 is likewise provided with similar sprocket wheels, one of which is shown at 22 in Fig. 2, the teeth of said sprocket wheel being located a suitable distance apart to engage between the parallel tread mill bars 20 so as to drive said tread mill.

Each of the bars 20 is provided at its opposite ends with antifriction rollers 23 journaled on projecting end pintles 24 of said bars and these rollers move within oppositely arranged guides 25 each of which is of oblong construction as shown in Fig. 1, providing endless raceways in which the rollers 23 move. At opposite ends of the tread mill there are arranged raised platforms 26, the upper surfaces of which are approximately in line with the upper surface of the tread mill element 20 to prevent injury to the feet of the operator in stepping upon and off the machine.

Above the tread mill is arranged a horizontal bar 27 supported by oppositely arranged uprights 28 extending down to the floor and being secured thereto at opposite sides of the tread mill. The horizontal bar is braced by means of oppositely inclined stays 29 which extend from the upper ends of the uprights 28 downward to the floor to which they are secured in any convenient manner.

From the foregoing description it will be understood that the crank shaft 4 and the tread mill are motor-actuated and therefore when the athlete grasps the handles 8, compulsory exercise is enforced. When the athlete occupies the tread mill he is forced to keep in motion commensurate with the speed at which the mill is driven in order to maintain his position on the tread mill. When fatigued, he may grasp the horizontal bar 27 and thereby remove any desired portion of his weight from his feet, thus varying the degree of exercise.

Having thus fully described the invention, what is claimed as new is:—

In an exercising machine, the combination with reciprocatory hand grips, rods by which said grips are carried, and guides for said rods, of a rotary crank shaft with which said rods are connected, and a motor geared to said crank shaft for imparting rotary motion thereto, substantially as described.

In testimony whereof I affix my signature in presence of two witnesses.

JOHN F. VANDERBOSS.

Witnesses:
BENJAMIN OHKINGA,
ANDREW P. THOMPSON.